Jan. 3, 1961 S. T. KOHN 2,967,271
VOLTAGE REGULATOR
Filed Nov. 10, 1958

SAMUEL T. KOHN
INVENTOR

BY Ralph E. Bitner
ATTORNEY

2,967,271

VOLTAGE REGULATOR

Samuel T. Kohn, South Norwalk, Conn., assignor, by mesne assignments, to Sorensen & Company, Incorporated, South Norwalk, Conn., a corporation of Delaware Filed Nov. 10, 1958, Ser. No. 772,987

3 Claims. (Cl. 323—60)

This invention relates to a voltage regulator of the resonant type for stabilizing an alternating current voltage. It has particular reference to a stabilizing system which employs a saturated core as part of the system but is specifically directed to the provision of an output voltage which is low in harmonic content.

Resonant regulators employing a resonant circuit which includes a capacitor and an inductor on a saturated core are old in the art and have been used for some time with exceptional results. The one disadvantage of this type of regulator is the poor wave form of the output voltage. This wave form is caused by the saturable inductor in the resonant circuit which introduces odd harmonics into the system. The present invention reduces the harmonic content of the output power to a very low value. This is done by first providing a small inductor which is resonant with the capacitor at the third harmonic of the frequency used. This resonant circuit does not remove all of the third harmonic, so an additional circuit is added to improve the wave form. A tap is connected to the inductor so that the third harmonic voltage between one of the input terminals and one of the output terminals balances out the residual third harmonic portion of the wave which exists between the other input terminal and the output terminal. In this manner an output voltage is provided having a wave form which is almost a pure sine wave and is a vast improvement over prior art voltage regulators.

One of the objects of this invention is to provide an improved voltage regulator which avoids one or more of the disadvantages and limitations of prior art regulators.

Another object of the invention is to reduce the harmonic content of the output voltage of a regulator to a very low value.

Another object of the invention is to reduce the weight of voltage regulators.

Another object of the invention is to provide an alternating current voltage regulator which has no moving parts, no rectifier elements, and no vacuum tubes.

One feature of the invention includes a tapped winding on a magnetic core which is designed to be saturated during the normal operation of the circuit. Part of this winding is in series with the input circuit. The entire winding is connected in parallel with a capacitor and a small inductor for near resonance at the frequency of the applied voltage. The capacitor and the small inductance are also resonant at the third harmonic of the applied wave to partially remove the third harmonic from the output voltage. The small inductor winding is tapped for connection to one of the output terminals thereby providing a third harmonic voltage between an input terminal and an output terminal, this voltage serving to balance out a third harmonic residual voltage which exists between the other input terminal and the other output terminal.

Figure 1:
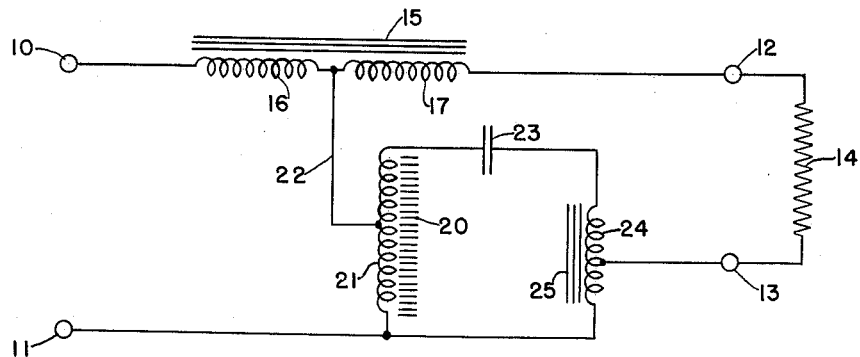
Fig. 1 is a schematic diagram of the voltage regulator.
Figure 2:
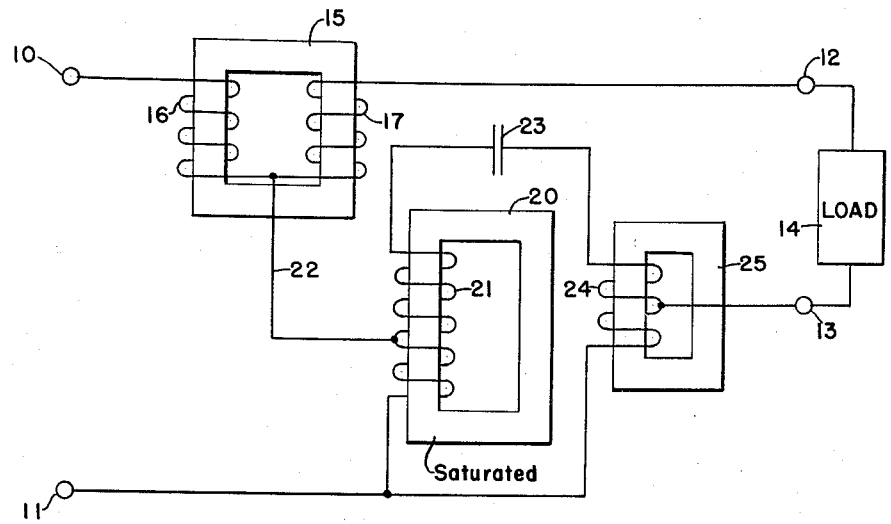
Fig. 2 is another schematic diagram showing the cores and windings as they actually exist.

Referring now to Figs. 1 and 2, the voltage regulator includes a pair of input terminals 10, 11, which are to be connected to a source of alternating current power which may vary considerably in applied voltage. The regulator also includes a pair of output terminals 12, 13, for connection to a load 14, the voltage across which is stabilized within a narrow range of voltage values.

The regulator system includes a first magnetic core 15 having a primary winding 16 and a secondary winding 17 enclosing the core and connected in series. One end of the primary winding is connected to one input terminal 10 and one terminal of winding 17 is connected to output terminal 12. This transformer is designed to operate with a magnetic flux which does not cause saturation of its magnetic core.

A second core 20 is employed with a single winding 21 tapped near its middle portion for connection to a conductor 22 which is connected to the junction point of windings 16 and 17. One end of winding 21 is connected to input terminal 11 while the other end of the winding is connected to a capacitor 23. Winding 21 is part of a resonant circuit which operates at near resonance for the frequency applied to input terminals 10, 11. This resonant circuit includes the winding 21, the capacitor 23, and a small winding 24 which encloses a third core 25. The values of inductance and capacitance are selected so that the inductance of winding 21 plus the capacitance of capacitor 23 plus the inductance of winding 24 are near resonance for the input frequency, while at the same time the capacitance of capacitor 23 and the inductance of winding 24 are resonant at the third harmonic of the applied frequency. The series circuit formed by capacitor 23 and inductor 24 bypasses a large proportion of the third harmonic generated in winding 21 due to the fact that its core 20 is saturated and the inductance of winding 21 changes considerably during each cycle. However, due to the resistance of core 24 and the inherent A.C. resistance of capacitor 23, not all of the third harmonic is removed from the output voltage. In order to balance out this residual voltage, output terminal 13 is connected to a tap on winding 24, thereby producing a third harmonic voltage between output terminal 13 and input terminal 11. This voltage is reasonably close to being 180 degrees from the residual third harmonic which exists between input terminal 10 and output terminal 12 and because of this phase angle most of the third harmonic voltage is removed from the system.

The function of transformer 15 is well-known and compensates for variations in load. The function of the resonant circuit which includes capacitor 23 and winding 21 is also well-known and operates to compensate for changes in input voltage by increasing the impedance of resonant circuit when the input voltage drops, thereby increasing the output voltage a like amount to maintain the output voltage at its desired value.

The foregoing disclosure and drawings are merely illustrative of the principles of this invention and are not to be interpreted in a limiting sense. The only limitations are to be determined from the scope of the appended claims.

I claim:

1. An alternating current voltage regulator for providing an output voltage low in harmonic content comprising; a first magnetic core having a primary and secondary winding thereon; a second magnetic core having a single winding thereon with a current tap; a third magnetic core having a single winding thereon with a current tap; an input circuit including input terminals for connection to a source of alternating current power which may vary in applied voltage, said input circuit also including the primary winding on said first core and that portion of the winding on said second core between the current tap and one end of the winding; an output circuit including output terminals for connection to a load, the secondary winding on said first core, that portion of the winding on the second core included in the input circuit, and a portion of the winding on the third core; a first resonant circuit adjusted to near resonance at the applied frequency which includes the winding on the second core, the winding on the third core, and a capacitor; and a second resonant circuit adjusted to resonance at three times the applied frequency which includes said capacitor and said winding on the third core.

2. An alternating current voltage regulator as set forth in claim 1 wherein said first and third cores are arranged to operate with non-saturating magnetic flux and said second core is arranged for saturated operation.

3. An alternating current voltage regulator as set forth in claim 2 wherein that portion of the winding on the third core between an output terminal and an input terminal provides a third harmonic voltage which balances the residual third harmonic voltage existing between the other input terminal and the other output terminal.

References Cited in the file of this patent
UNITED STATES PATENTS
2,505,620     John et al. _____ Apr. 25, 1950